United States Patent [19]
Iihoshi et al.

[11] Patent Number: 5,579,010
[45] Date of Patent: Nov. 26, 1996

[54] MULTIBEAM RADAR SYSTEM

[75] Inventors: Akira Iihoshi; Ken-ichi Tohya, both of Wako, Japan

[73] Assignee: Honda Giken Kogyo Kabushiki Kaisha, Tokyo, Japan

[21] Appl. No.: 449,822

[22] Filed: May 24, 1995

[30] Foreign Application Priority Data

May 27, 1994 [JP] Japan .................................. 6-137993

[51] Int. Cl.$^6$ .............................. G01S 13/60; G01S 13/94
[52] U.S. Cl. ......................... 342/70; 342/108; 342/115; 342/117; 342/133
[58] Field of Search ............................. 342/114, 115, 342/117, 128, 130, 133, 145, 157, 158, 70, 71, 72, 108, 99

[56] References Cited

U.S. PATENT DOCUMENTS

| | | | |
|---|---|---|---|
| 3,495,246 | 2/1970 | Schonoborn | 342/147 X |
| 3,513,471 | 5/1970 | Mooney, Jr. et al. | 342/147 X |
| 4,110,754 | 8/1978 | Endo | 342/147 X |
| 4,180,814 | 12/1979 | Barton | 342/147 X |
| 4,771,288 | 9/1988 | Johnson | 342/147 X |
| 4,912,474 | 3/1990 | Paturel et al. | 342/191 |
| 5,008,678 | 4/1991 | Herman | 342/158 |
| 5,045,856 | 9/1991 | Paoletti | 342/70 |
| 5,181,037 | 1/1993 | Komatsu | 342/70 |
| 5,448,244 | 9/1995 | Komatsu et al. | 342/155 |

FOREIGN PATENT DOCUMENTS 4-125484  4/1992  Japan .
5-273339  10/1993  Japan .
5-264728  10/1993  Japan .

*Primary Examiner*—John B. Sotomayor
*Attorney, Agent, or Firm*—Lyon & Lyon

[57] ABSTRACT

A multibeam radar system. A matrix or inverse matrix indicating the characteristics of beams of ultrasonic waves or radio waves are previously created for each individual scanning direction (channel) and stored in a memory. Physical quantities corresponding to the intensities of echo signals and to the distance to an object are detected, and temporarily stored in another memory together with the corresponding scanning directions. Those of the temporarily stored data items which represent physical quantities corresponding to the same distance are arranged in rows or columns corresponding to the scanning directions. Inverse calculation processing, or deconvolution processing, is performed according to the matrix or inverse matrix indicating the beam characteristics. In this way, the reception level is corrected.

10 Claims, 7 Drawing Sheets

RECEPTION LEVELS OF TRANSMISSION-RECEPTION CHANNELS
DISTRIBUTION OF REFLECTIVITIES ON DETECTED OBJECT

DIRECTION OF TRANSMISSION AND RECEPTION

CORRECTED DISTRIBUTION OF REFLECTIVITIES ON OBJECT

DIRECTION OF TRANSMISSION AND RECEPTION

MULTIBEAM RADAR SYSTEM

BACKGROUND OF THE INVENTION

1. Field of the Invention

The present invention relates to a multibeam radar system for obtaining information such as the presence or absence of an object (target), the distance to the object, and the speed relative to the object by scanning beams of ultrasonic waves or radio waves in numerous directions, sending the beams, and receiving echo waves from the object.

2. Description of the Related Art

Two known means are available to scan beams of ultrasonic waves or radio waves within a certain angular range within a certain plane. One means is a mechanically scanning radar system using a rotated antenna. The other means is an electronically scanned radar system for making electronic scans. Waves are transmitted from such a radar system and echo waves are reflected from the object. Various kinds of information, (i.e., the intensity of received signal, the presence or absence of the object indicated by the intensity of received signal, the distance to the object, and the speed relative to the object) are contained in the echo waves. Since the aforementioned scan is often performed within a given angular range within a horizontal plane, the direction of scan is also known as the azimuth direction.

In the case of a radar system installed on a vehicle, fixed structures such as guardrails exist on roads and are close to a vehicle to be detected. Therefore, it is necessary to discern the features of the shape of the object producing echo waves and to erase unwanted images. Consequently, rough detection of the shape or contour of the object is needed, in addition to the detection of the presence or absence of the object. When the shape or contour is discerned, the azimuthal resolution is of importance.

In any of the aforementioned radar systems, however, if millimetric waves are used, the transmitted beam has a considerable width and so the azimuthal resolution can deteriorate. The azimuthal resolution can be effectively enhanced by reducing the beam width. Although it is possible to narrow the beam by making the reflector antenna larger, restrictions are imposed on the increase of the size of the antenna because it must be installed on a small-sized moving object such as a vehicle. The beam width can be reduced by using higher transmission frequencies but the transmission loss increases as higher frequency is employed. In this way, limitations are placed on enhancement of the azimuthal resolution where the method making use of narrowing of the beam is exploited.

On the other hand, in the case of a laser radar, it is possible to narrow the beam. However, it is vulnerable to natural environmental variations such as fog and rain. Therefore, the laser radar cannot meet the requirements imposed on the vehicular radar system.

A deformed deconvolution method as described in Japanese Patent Laid-Open No. 125484/1992 is known as a method of enhancing the azimuthal resolution at a considerable beam width. In this deformed deconvolution method, a beam having a finite width is treated as an apparatus function having a spatial spread. An object existing in a scanned space is treated as a signal source having a spatial spread and attributes, i.e., positions in the azimuthal direction and intensities of reflected signals. In this way, the deconvolution method which is known as a method of processing signals in a time-and-space domain is extended to a method of processing signals inside a real space. That is, inverse calculational processing of the apparatus function is applied to received, reflected waves emanating from plural signal sources which are sporadically located in the real space. In consequence, the azimuthal resolution is improved.

The optimum scanning method for enhancing the azimuthal resolution is next discussed. A mechanically scanning radar system needs a mechanism for rotating an antenna and a device for driving the rotating mechanism and so the system is large in size. This makes it difficult to install the system on a relatively small-sized moving object such as a vehicle. In addition, since the object on which the system is installed moves, the rotating mechanism and its driving device must be sturdy enough to withstand vibrations that the moving object undergoes. Moreover, the moving object carrying the radar system moves at a relatively high speed and, therefore, the radar system is required to attain a scanning speed corresponding to the moving speed. The mechanically scanning radar system has the advantage that it can secure relatively high azimuthal resolution, but it is difficult for the rotating mechanism to accommodate itself to the scanning speed required by the moving object. For these reasons, the electronically scanning radar system is more practical than the mechanically scanning radar system.

A typical example of the aforementioned electronically scanning radar system is the time-sharing electronically scanning system previously proposed by the present Applicant in Japanese Patent Laid-Open No. 264728/1995. In this system, the same number of antennas as the number of beams are arrayed. Since a large number of antennas are used, the whole system is bulky. Hence, this system is not as suitable as would be desired as a long-range radar system over a highway. Another antenna already proposed by the present Applicant is disclosed in Japanese Patent Laid-Open No. 273339/1995. This antenna makes it possible to detect a long distance such as about 100 m ahead of a vehicle. The whole of this antenna can be made small. A defocus multibeam antenna is used as this antenna and has the same number of small primary feed horns arrayed as the number of beams. The feed horns reflect incident waves toward a common reflector antenna. A further typical electronically scanning radar system is a phased array radar system comprising an array of small antennas. The phases of signals received by the individual antennas are matched in the azimuthal direction.

However, whether the electronically scanning radar system using the defocus multibeam antenna or the phased array system is employed, transmitted beams more spaced from the center of the scanning range (i.e., spaced closer to both ends of the range) are deformed to a greater extent. This deteriorates the azimuthal resolution and, at the same time, narrows the range in the direction of detection. Since the beams in every direction do not have the same shape, the azimuthal accuracy is not improved even if the deconvolution method described in the above-cited Japanese Patent Laid-Open No. 125484/1992 is used as it is.

Another radar system makes use of an FM radar system. An antenna is located at the origin of a two-dimensional space which is expressed in terms of a polar coordinate system. Objects are sporadically dispersed in this space and reflect signals. These reflected signals are processed appropriately to accomplish accurate measurements. However, there is room for discussion of the order in which the reflected signals are processed.

SUMMARY OF THE INVENTION

It is a main object of the present invention to provide a multibeam radar system having an improved resolution in the direction of scanning.

A multibeam radar system according to the present invention comprises: a multibeam transmission-and-reception means for transmitting beams of ultrasonic waves or radio waves in a direction, receiving echo signals from an object, electronically scanning the transmitted beams while changing the direction of beams discretely to horizontal direction toward the road, and repeating these operations for plural transmission-reception channels determined according to directions of transmission and reception, scanning beams both horizontal and perpendicular to the road only for imaging of three-dimensional; a reception level-holding means for detecting intensities of echo waves received from the object at the transmission-reception channels, detecting a distance to the object or a corresponding physical quantity, and successively storing them as reception levels of the transmission-and-reception channels; a matrix or inverse matrix multibeam pattern storage means for previously creating and storing a matrix of multibeam patterns comprising a matrix of beam patterns corresponding to the transmission-reception channels or a matrix that is an inverse of the first-mentioned matrix, said beam patterns being squares of directivities of the transmitted beams of the transmission-reception channels represented in terms of sets of discrete values of the directions of transmission and reception; and an inverse calculation means for arranging those of the reception levels of the transmission-reception channels previously stored in the reception level-holding means which show substantially the same distance or corresponding physical quantities in corresponding rows or columns, performing inverse calculation processing according to said matrix or inverse matrix of said multibeam pattern stored in said matrix or inverse matrix multibeam pattern storage means, whereby calculating correcting values for the reception levels of the transmission-reception channels.

Beam patterns used in the present invention correspond to apparatus functions in the above-described deformed deconvolution processing. For the deconvolution processing, refer to "Processing of Data on Waveforms for Scientific Measurements", published by CQ Publishing Company, Japan. In the present invention, the apparatus function is defined independently for each individual beam according to different directivities of numerous beams. In consequence, the accuracy of corrections is improved. Furthermore, those of the received signals of the transmission-reception channels which arise from substantially the same distance are extracted and subjected to deconvolution processing. In this way, a multiplicity of reflecting sources distributed in a two-dimensional space can be detected at high resolution.

Other objects and features of the invention will appear in the course of the description thereof, which follows.

DETAILED DESCRIPTION OF THE INVENTION

The preferred embodiments of the invention are hereinafter described in detail by referring to the accompanying drawings.

Figure 1:
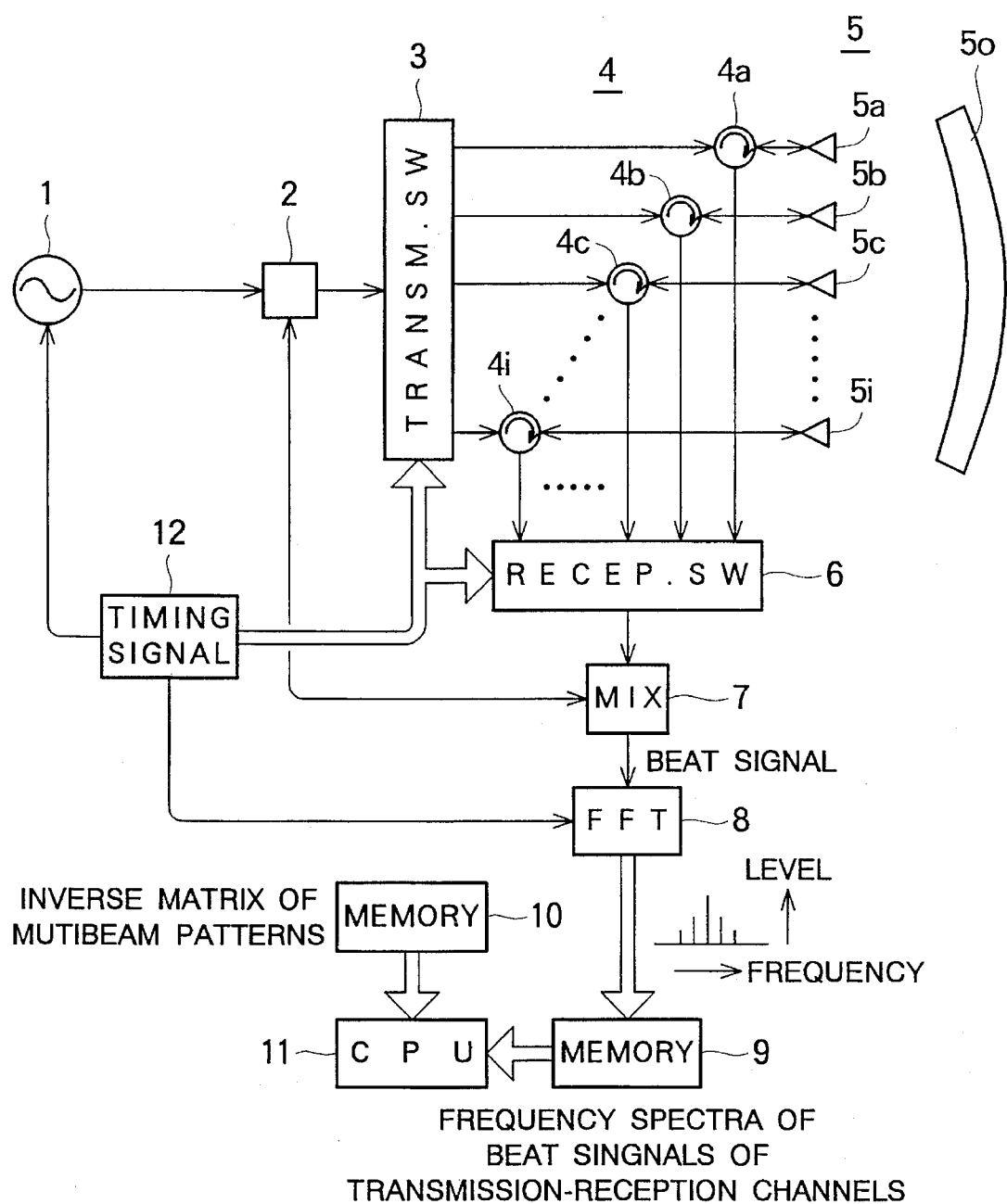
FIG. 1 is a block diagram of a multibeam radar system according to one embodiment of the present invention.

FIG. 1 is a block diagram of a multibeam radar system according to the invention. This system comprises an FM signal generator 1, a power divider 2, a transmission switching circuit 3, circulators $4a$–$4i$, primary radiators $5a$–$5i$, a parabolic reflecting mirror $5o$, a reception switching circuit 6, a mixer 7, a fast Fourier transform (FFT) circuit 8, memories 9, 10, a CPU 11, and a timing signal-generating circuit 12.

The memory 9 constitutes a reflected signal storage means. The memory 10 forms a multibeam pattern storage means. The mixer 7, the FFT circuit 8, and the memory 9 together form a reception level-holding means. The CPU 11 forms an inverse calculation means.

The FM signal generator 1 produces a frequency-modulated (FM) signal whose frequency varies in a sawtoothed fashion at given intervals of time within a given range according to a timing signal supplied from the timing signal-generating circuit 12. The FM signal has a central frequency of 60 GHz and sweep frequency range of ±100 MHz for Japanese market. Different range will be used for U.S. and European market. The FM signal is divided half by the power divider 2, but a divide ratio varies depending upon performance of a mixer or amplifier. One output from the divider 2 is supplied as a transmitted FM signal to the transmission switching circuit 3, while the other output is supplied as a local signal to the mixer 7. The transmitted FM signal fed to the switching circuit 3 is selectively passed through switching devices having gains formed by FET amplifiers or the like which are intermittently operated, depending on whether a bias voltage is increased or reduced. The signal is then supplied to the nine antennas $5a$–$5i$ successively via the circulators $4a$–$4i$, respectively, and radiated.

In practice, the nine antennas $5a$–$5i$ together form an offset defocus multibeam antenna, which comprises the offset parabolic reflecting mirror $5o$ and nine primary radiators arrayed close to the focus of the reflecting mirror $5o$. In particular, beams radiated from the nine primary radiators arrayed close to the focus of the parabolic mirror $5o$ are reflected by this mirror $5o$ and radiated in different directions. For simplicity, the nine antennas $5a$–$5i$ are shown to be functionally equivalent, independent antennas.

The wave reflected from one of the antennas 5a–5i is reflected by an object existing in front of the beams. The reflected wave is propagated in a sense opposite to the sense of transmitted beams and enters the antennas 5a–5i. The output signals from these antennas 5a–5i which indicate the received signal are supplied to the reception switching circuit 6 through the circulators 4a–4i. The reception switching circuit 6 is composed of switching devices such as FETs which are activated and deactivated in synchronism with the transmission switching circuit 3. The reception switching circuit 6 selects one out of the received signals and supplies it to the mixer 7. The transmission switching circuit 3 and the reception switching circuit 6 operate synchronously in such a way that only the received signal from the antenna presently radiating a beam is selected and supplied to the mixer 7. The nine antennas 5a–5i and a transmission RF circuit for causing beams to be radiated from their respective antennas are hereinafter collectively referred to as the transmission-reception channels.

The received signal of each transmission-reception channel supplied to the mixer 7 is mixed with the local signal which is supplied via the power divider 2. As a result, a beat signal of a frequency equal to the frequency difference between these two signals is produced. Both frequency of the received signal and frequency of the local signal vary linearly with time. Therefore, the difference between them, i.e., the frequency of the beat signal, is in proportion to the propagation time (i.e., the time taken for the transmitted beam to travel from its antenna to the object and back to the antenna). Hence, the frequency of the beat signal is proportional to the distance from the antenna to the object. The beat signal generated by the mixer 7 is passed through a low-pass filter circuit (not shown) incorporated in the mixer and supplied to the FFT circuit 8 where the signal is transformed into a frequency spectrum comprising frequency components and their levels. Then, the transformed signal is written to those addressed regions in the memory 9 which are assigned to the transmission-reception channels, respectively. The FFT circuit 8 incorporates an A/D converter for converting the analog beat signal into digital form. The CPU 11 reads the frequency spectra of the transmission-reception channels written to the memory 9 and performs various kinds of processing such as corrections utilizing deconvolution, elimination of noize, output of calculated data into other unit (auto-cruise control unit, auto unit brake unit, steering unit etc.), conversion of the frequency to a distance.

Figure 2:
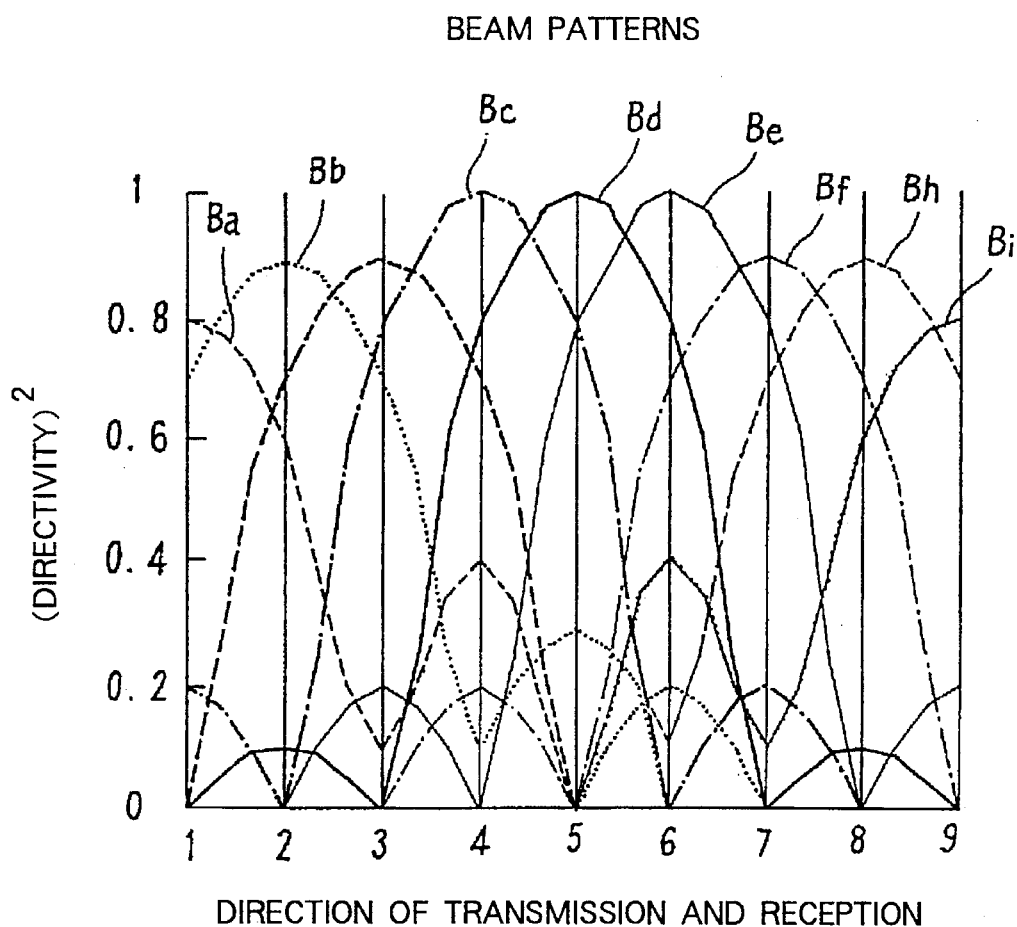
FIG. 2 is a conceptual diagram of beam patterns of the defocus multibeam antenna used in the radar system shown in FIG. 1.

FIG. 2 shows examples of curves Ba, Bb, . . . , Bi corresponding to the squares of the power density distributions (directivities) of the transmitted beams of the nine channels A–I radiated from the nine antennas 5a, 5b, . . . , 5i, respectively. Assuming that the directions of the centers of the curves are equally spaced from each other and designated 1, 2, 3, . . . , 9, respectively, the sets of the discrete values of the curves Ba–Bi relative to the transmission and reception directions 1–9 are referred to as the beam patterns of the transmission-reception channels.

In FIG. 2, the beam patterns for the directions 1, 2, 3, . . . , 9 are not always the same. Rather, their shapes are more blunted with approaching both ends. For example, in the beam patterns Ba and Bi at both ends, the level of the side lobe is only −3 dB compared with the level of the main beam. Therefore, with respect to received signals in the directions 1 and 9, reflected waves traveling in the directions 4 and 6 are superimposed on fundamental reflected waves traveling in the directions 1 and 9. In this way, unwanted signals are added. Therefore, with the multibeam radar having such beam patterns, information coming from various directions cannot be accurately measured. In the present example, only the central beams Bd, Be, and Bf can be used, because it is difficult to discriminate the direction where there is an obstacle if the other beam is used. In our experimental, the difference between the main lobe and side lobe should be larger than 10 dB for automobile's radar. In consequence, the detectable range of directions is restricted.

Figure 3:
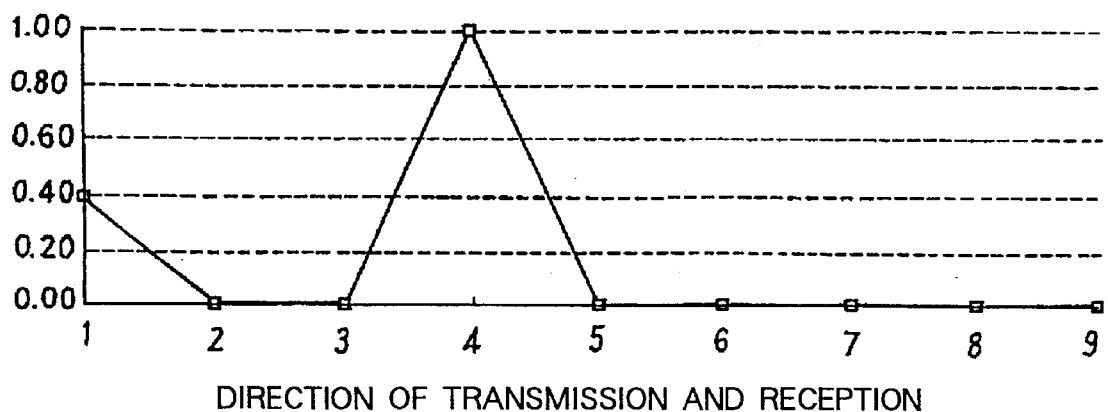
FIG. 3 is a diagram illustrating the spatial distribution of an object expressed in terms of its reflectivities for radio waves and its positions.
Figure 4:
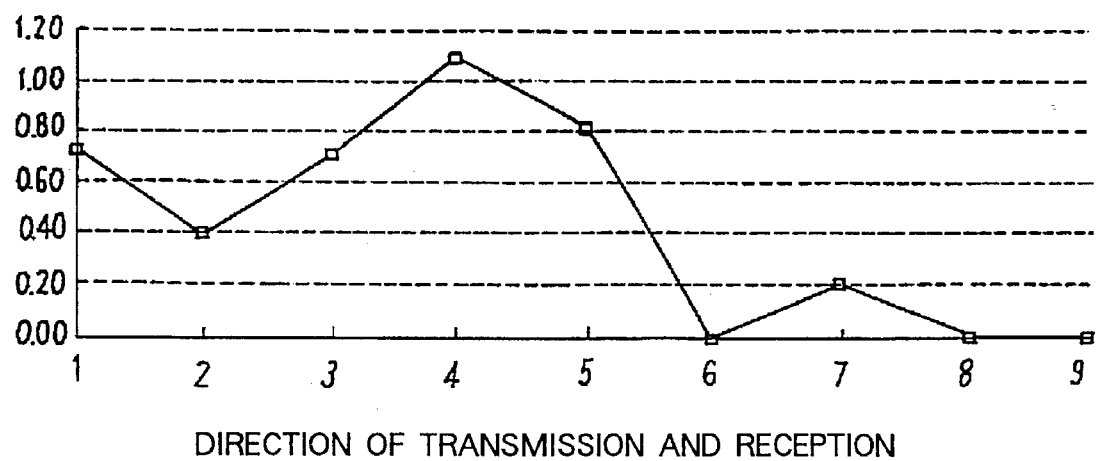
FIG. 4 is a conceptual diagram illustrating the levels of received signals actually measured for each transmission-reception channel shown in FIG. 1 where the beams having the beam pattern shown in FIG. 2 are radiated toward an object having the spatial distribution shown in FIG. 3.
Figure 5:
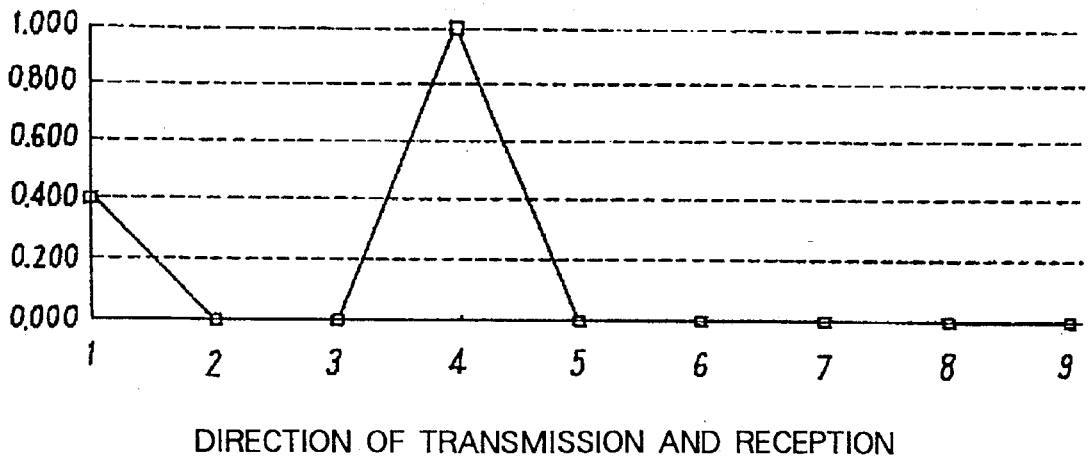
FIG. 5 is a conceptual diagram illustrating the levels of received signals of various transmission-reception channels, and in which the signals have been corrected by inverse calculation processing.

An object showing a reflectivity distribution as shown in FIG. 3 was measured, using such a multibeam pattern. The received signals showed a distribution as shown in FIG. 4. The threshold value of the level of the received signal which was used to judge the presence or absence of an object was set to 0.3. It followed that objects existed in the directions 1, 2, 3, 4, and 5. This means that the accuracy was poor. In deconvolution processing described later, received signals are corrected as illustrated in FIG. 5 by inverse calculation means. As a result, objects exist only in the directions 1 and 4, i.e., a detection operation is performed correctly. By deconvolution processing, precision of signals received from all directions improves. FIG. 5 shows that the precision of perceiving side beams of Ba Bb, Bc, Bg, Bh, Bi has improved as precise as in FIG. 3. When they can be used, the range of detection can be extendable.

As described above, the directions of the centers of the curves Ba–Bi are equally spaced from each other and made to agree with the transmission-reception directions 1–9, respectively. The sets of discrete values of the curves Ba–Bi relative to the transmission-reception directions 1–9 are referred to as the beam patterns of the transmission-reception channels. The beam patterns defined in this way correspond to apparatus functions in deformed convolution processing. The present invention is characterized in that the apparatus functions are not always the same for the transmission-reception channels corresponding to scanning directions. Where the beam patterns corresponding to the transmission-reception channels are arrayed, a matrix as shown in Table 1 is obtained.

TABLE 1

|  | Dir. 1 | Dir. 2 | Dir. 3 | Dir. 4 | Dir. 5 | Dir. 6 | Dir. 7 | Dir. 8 | Dir. 9 |
| --- | --- | --- | --- | --- | --- | --- | --- | --- | --- |
| Ch. A | 0.8 | 0.6 | 0.1 | 0.4 | 0 | 0 | 0 | 0 | 0 |
| Ch. B | 0.7 | 0.9 | 0.7 | 0.1 | 0.3 | 0 | 0 | 0 | 0 |
| Ch. C | 0 | 0.7 | 0.9 | 0.7 | 0 | 0.2 | 0 | 0 | 0 |
| Ch. D | 0.2 | 0 | 0.8 | 1 | 0.8 | 0 | 0.2 | 0 | 0 |
| Ch. E | 0 | 0.1 | 0 | 0.8 | 1 | 0.8 | 0 | 0.1 | 0 |
| Ch. F | 0 | 0 | 0.2 | 0 | 0.8 | 1 | 0.8 | 0 | 0.2 |
| Ch. G | 0 | 0 | 0 | 0.2 | 0 | 0.7 | 0.9 | 0.7 | 0 |
| Ch. H | 0 | 0 | 0 | 0 | 0.3 | 0.1 | 0.7 | 0.9 | 0.7 |
| Ch. I | 0 | 0 | 0 | 0 | 0 | 0.4 | 0.1 | 0.6 | 0.8 |

(Ch. = Channel; Dir. = Direction)

The matrix of the beam patterns listed in Table 1 is expressed as indicated by Eq. (1).

$$H = [h_{ij}] = \begin{bmatrix} h_{aA} & h_{aB} & h_{aC} & \cdots & h_{aI} \\ h_{bA} & h_{bB} & h_{bC} & \cdots & h_{bI} \\ h_{cA} & h_{cB} & h_{cC} & \cdots & h_{cI} \\ \cdot & \cdot & \cdot & \cdots & \cdot \\ \cdot & \cdot & \cdot & \cdots & \cdot \\ \cdot & \cdot & \cdot & \cdots & \cdot \\ h_{iA} & h_{iB} & h_{iC} & \cdots & h_{iI} \end{bmatrix} \quad (1)$$

The reflectivity distribution of an object having a breath of azimuthal direction is given by $$X = [x_A \ x_B \ x_C \ \ldots \ x_I]^T \quad (2)$$

If examples of numerical values of the X are as shown in FIG. 3, then the signal Y=[$y_A$ $y_B$ $y_C$ ... $y_I$]$^T$ in each direction which is measured by this multibeam radar is the product of the two matrices H and X, i.e., $$Y = H\,X \quad (3)$$

FIG. 4 shows the results of measurements of transmission-reception directions when an object having the reflectivity distribution shown in FIG. 3 is measured with the multibeam pattern shown in FIG. 2 and calculated, using Eq. (3). In this way, the measured reflection intensity is distorted, depending on the multibeam pattern.

We can see that the true reflectivity distribution $x_j$ of the object is found by finding the inverse matrix of the multibeam pattern H and multiplying the inverse matrix by both terms of Eq. (3). Thus, $$H^{-1}\,Y = H^{-1}\,H\,X = I\,X = X \;\therefore X = H^{-1}\,Y \quad (4)$$

where I is a unit matrix. The contents of the inverse matrix of Table 1 are shown in Table 2. The inverse matrix of this beam pattern is previously calculated and stored in the memory 10.

where $D^{-1}$ is the diagonal inverse matrix of the matrix H of beam patterns. $X^k$ is made to approach the true value, using this approximate equation.

The sequence in which signals are processed where the deconvolution processing using the inverse matrix of the aforementioned multibeam patterns is applied to the time-sharing scanning radar shown in FIG. 1 is next described in detail.

Figure 6:
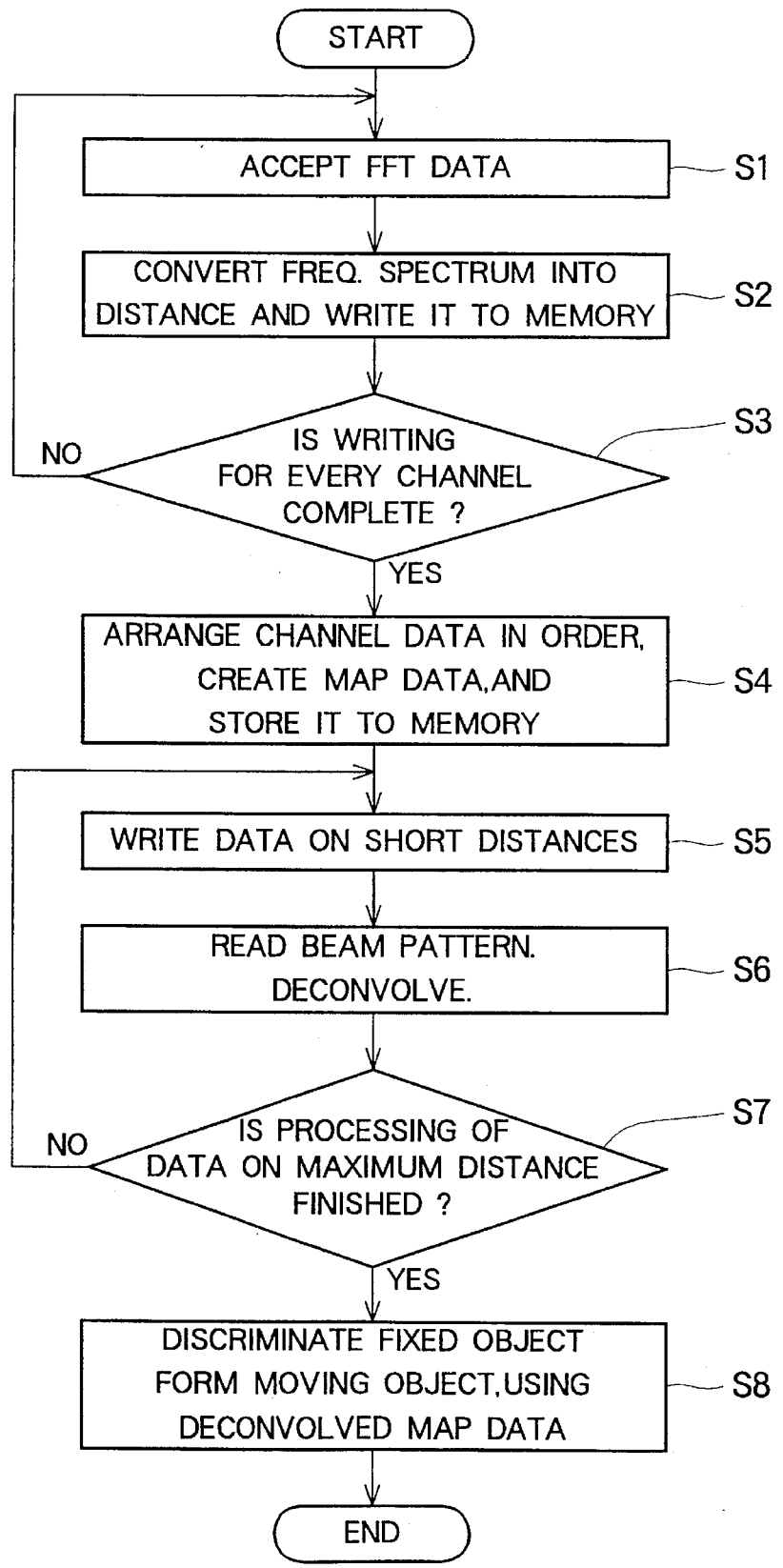
FIG. 6 is a flowchart illustrating the sequence in which signals are processed under the control of the CPU shown in FIG. 1.

In the flowchart of FIG. 6, the CPU 11 shown in the block diagram of the time-sharing scanning FM radar converts the analog beat signal created by the mixer 7 into digital form, processes the digital signal by fast fourier transform, and then performs deconvolution processing. In this way, the object existing on two-dimensional polar coordinates corresponding to the scanning angle is recognized.

In step 1 (s1), the frequency spectrum of the beat signal is analyzed. The analog beat signal from the mixer 7 is converted into a digital beat signal by A/D converter. The digital beat signal is subjected to fast Fourier transform, thus finding frequency spectral data (FFT data). The frequency axis of the chart of the frequency spectral data (FFT data) corresponds to the distance of the object from the radar source. If the level of each frequency is in excess of a given

TABLE 2

|        | Dir. 1 | Dir. 2 | Dir. 3 | Dir. 4 | Dir. 5 | Dir. 6 | Dir. 7 | Dir. 8 | Dir. 9 |
|--------|--------|--------|--------|--------|--------|--------|--------|--------|--------|
| Ch. A  | 0.56   | 0.57   | −1.16  | 0.75   | −0.42  | −0.08  | 0.56   | −0.97  | 0.87   |
| Ch. B  | 0.45   | −0.15  | 1.16   | −1.27  | 0.55   | 0.17   | −0.72  | 1.26   | −1.15  |
| Ch. C  | −1.05  | 0.96   | −0.25  | 0.85   | −0.58  | −0.13  | 0.56   | −0.95  | 0.86   |
| Ch. D  | 0.97   | −1.17  | 0.64   | 0.19   | 0.16   | −0.06  | −0.19  | 0.29   | −0.24  |
| Ch. E  | −0.52  | 0.59   | −0.41  | 0.00   | 0.64   | 0.00   | −0.41  | 0.59   | −0.52  |
| Ch. F  | −0.24  | 0.29   | −0.19  | −0.06  | 0.16   | 0.19   | 0.64   | −1.17  | 0.97   |
| Ch. G  | 0.86   | −0.95  | 0.56   | −0.13  | −0.58  | 0.85   | −0.25  | 0.96   | −1.05  |
| Ch. H  | −1.15  | 1.26   | −0.72  | 0.17   | 0.55   | −1.27  | 1.16   | −0.15  | 0.45   |
| Ch. I  | 0.87   | −0.97  | 0.56   | −0.08  | −0.42  | 0.75   | −1.16  | 0.57   | 0.56   |

(Ch. = Channel; Dir. = Direction)

The CPU 11 reads the frequency spectrum of the beat signal of each transmission-reception channel from the memory 9 and collects the levels of beat signals of substantially equal beat frequencies from each transmission-reception channel. The collection is started from the side of lower beat frequencies. In this way, a result of detection Y=[$y_A$ $y_B$ $y_C$ ... $y_I$]$^T$ with respect to the corresponding distance range is created. Then, the CPU 11 multiplies the detection result Y by the inverse matrix $H^{-1}$ of the beam patterns read from the memory 10, thus calculating the reflectivity distribution X=[$x_A$ $x_B$ $x_C$ ... $x_I$]$^T$ of an object having a spread of azimuthal directions in the corresponding distance range. The measured value Y shown in FIG. 4 is multiplied by the inverse matrix $H^{-1}$ shown in Table 2. As a result, the reflectivity distribution X of the object is corrected. This corrected distribution X is shown in FIG. 5. Comparison of FIG. 3 with FIG. 5 reveals that the distribution has been precisely corrected. The CPU 11 repeats the processing for correcting the measured values, using the multiplication of the inverse matrix, with different ranges of distances corresponding beat frequencies.

The inverse calculation processing using matrix calculations has been described. This inverse calculation processing can also be performed by a repetitive method. In particular, the following approximate equation is used:

$$X^{k+1} = X^k + D^{-1}(Y - H\,X^k) \quad (5)$$

threshold value, it follows that the object is located at the distance corresponding to the frequency.

In step 2, the frequency is converted into a corresponding distance. Spectral data about the distance (hereinafter referred to as data about the distance or simply as the distance data) is written to the memory 9. The data about the distance is written to memory addresses corresponding to the scanning azimuth.

In step 3, a decision is made as to whether the data about the distance has been written to the memory 9 for every azimuth (every channel). Steps 1 and 2 are repeatedly carried out until the distance data are obtained for all the channels A–I.

Figure 7:
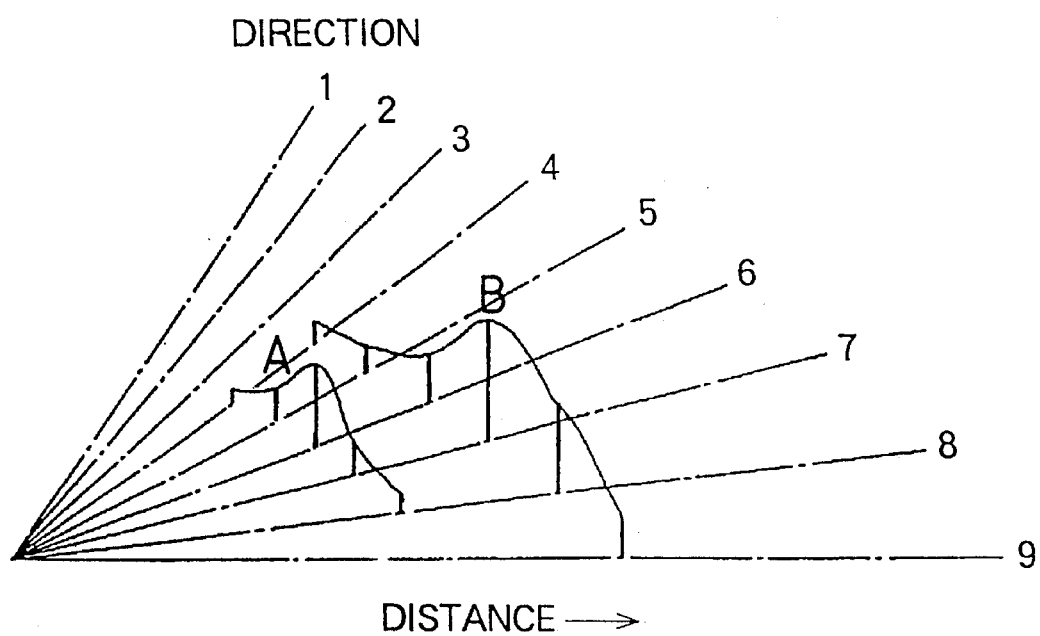
FIG. 7 is a diagram supplementally illustrating the contents of the signal processing sequence illustrated in FIG. 6.

In step 4, the distance data about the 9 channels are arranged in order of distance. Furthermore, the data are rearranged into polar coordinates such that the position of the radar is located at the origin O. In this manner, a two-dimensional polar coordinate map is created. The distance data is temporarily stored in the memory 9 in units of scanning azimuth (channel). The data is written to the memory addresses corresponding to the polar coordinates. FIG. 7 conceptually represents the distance data in three dimensions, the data being stored in the memory 9.

Figure 8:
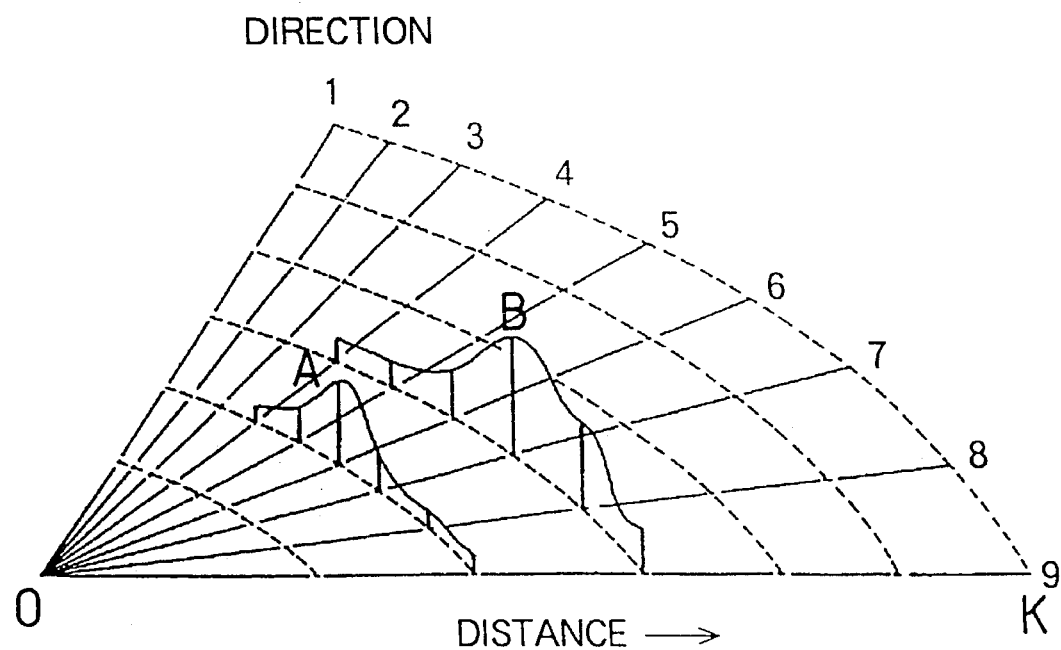
FIG. 8 is a diagram supplementally illustrating the contents of the signal processing sequence illustrated in FIG. 6.

In step 5, some of the spectral data on the two-dimensional polar coordinate system created in step 4 have the same distance from the origin O. The magnitudes of these spectra in every azimuth are successively accepted in given increments of distance from the origin O to the maximum detectable distance K and stored in a buffer memory incorporated in the memory 9. FIG. 8 illustrates the order in which the magnitudes are written into the buffer memory from the origin O to the maximum detectable distance K. At this time, the data in the buffer memory about the distance at which the object exists is represented in terms of azimuths and levels as shown FIG. 4.

In step 6, the data which has been stored in the buffer memory for each individual distance in step 5 and which indicates the level of each azimuthal direction as shown in FIG. 4 is subjected to deconvolution processing, using the multibeam antenna pattern shown in FIG. 2. For this processing, calculations can be performed, using the inverse matrix of the multibeam pattern as described already. The correct data can be found by the repetitive method using the approximate equation.

In step 7, a decision is made as to whether the deconvolution processing of step 6 has been effected from the origin O of the polar coordinate system to the maximum detectable distance K. If the processing does not yet proceed to the maximum detectable distance K, then steps 5 and 6 are repeated up to the maximum detectable distance K.

Figure 9:
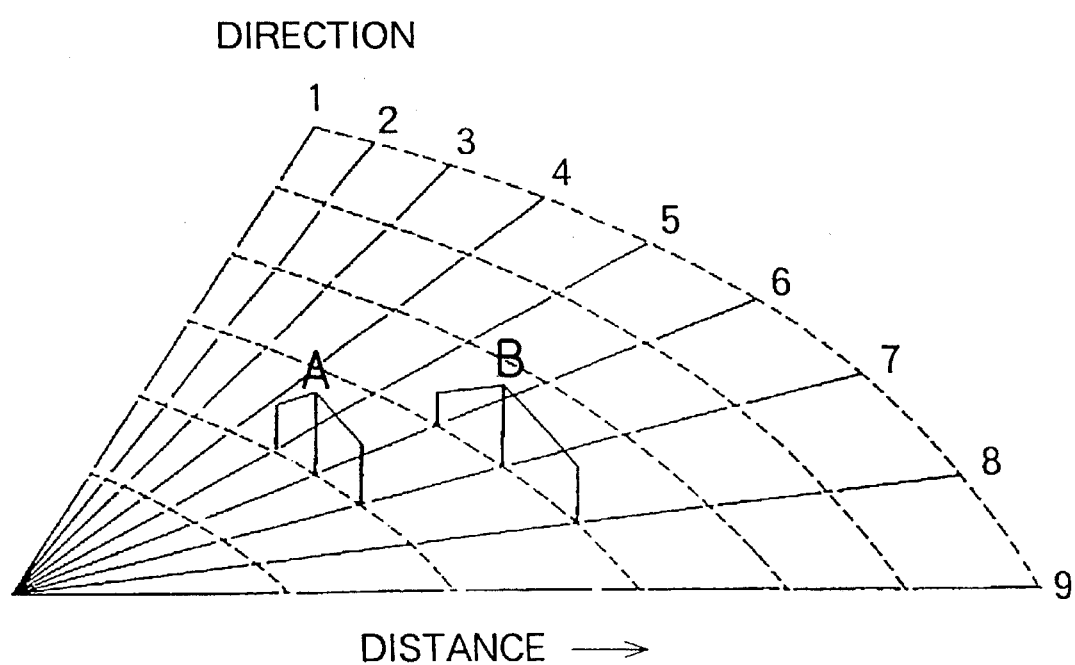
FIG. 9 is a diagram supplementally illustrating the contents of the signal processing sequence illustrated in FIG. 6.
Figure 7:
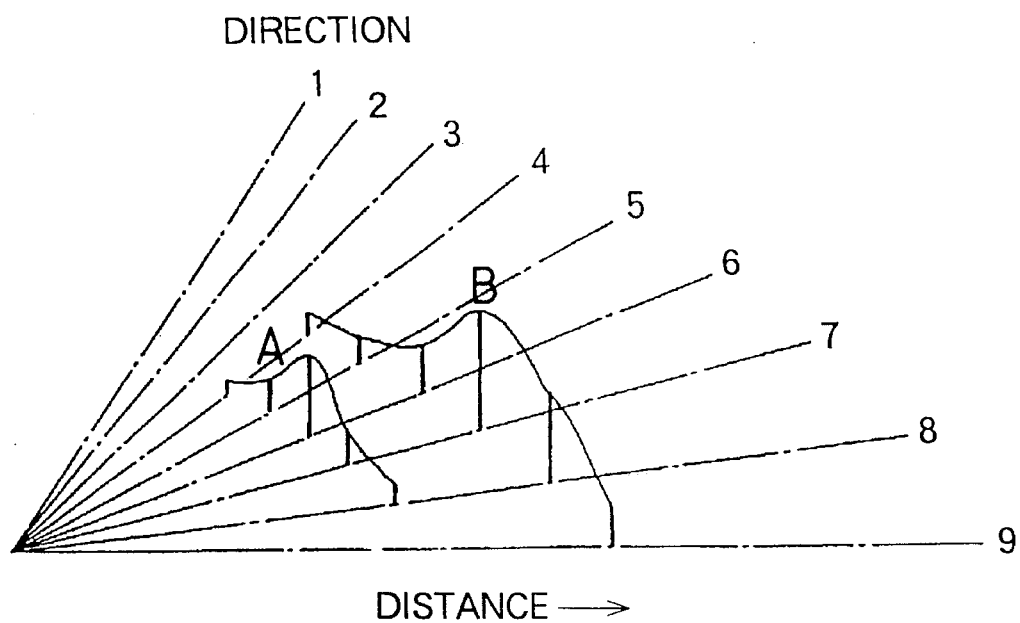
Figure 8:
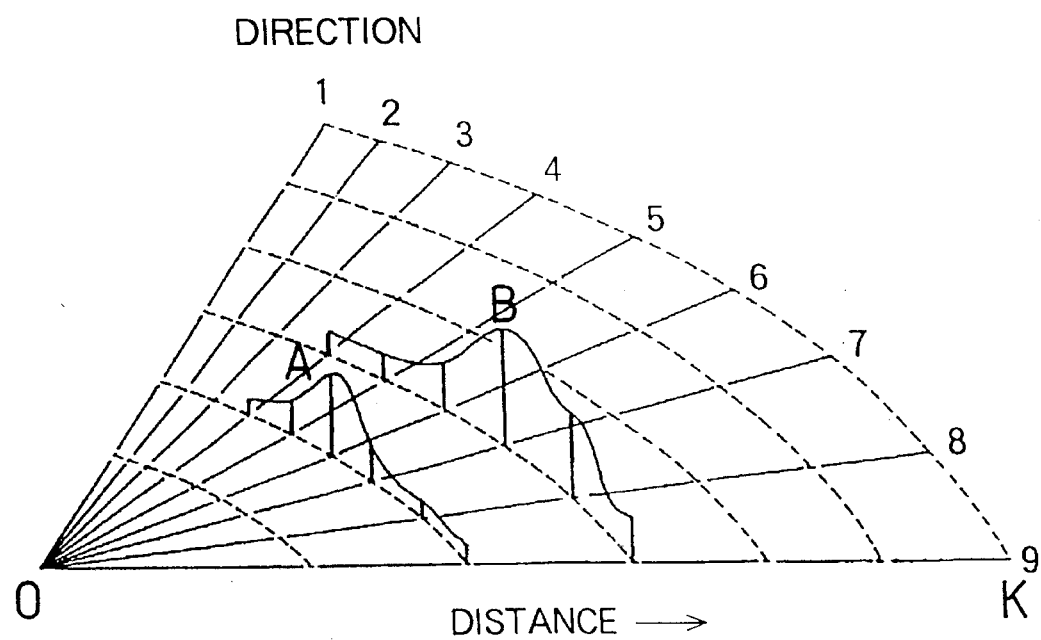

In step 8, all the data items on the polar coordinate system are subjected to deconvolution processing. Thus, data about an obstacle on true two-dimensional coordinates is found. Data obtained at this time is illustrated in FIG. 9. As illustrated in FIG. 9, data about azimuthal direction is precisely obtained and true reflection patterns from rear parts of Car A and B is showed. By the deconvolution processing, the positions, widths, and kinds of fixed objects such as guardrails and moving objects such as motorcycles and ordinary automobiles and the distances to the fixed and moving objects can be quite accurately detected. In this way, an electronically scanning FM radar system best suited for an automotive radar cruise control and for a driver-assisting system such as a radar brake system can be accomplished.

The novel multibeam radar system has been described by taking as an example the FM radar system for determining the distance to an object from the frequency difference between the transmitted signal and the received signal. However, it would be apparent that the invention can also be applied to various multibeam radar systems which determine the distance to an object from the time difference between the instant at which pulses are transmitted and the instant at which echo signals are received.

Moreover, the novel multibeam radar system has been described by taking the defocus multibeam antenna as an example, but the novel multibeam radar system can be applied to cases where phased array multiple beams are used.

As described in detail thus far, the inventive multibeam radar system is designed so that an apparatus function is defined independently for each individual beam according to different directions of numerous beams. Therefore, where a defocus multibeam antenna or a phased array antenna is used, corrections can be made according to the actual circumstances. In consequence, the accuracy at which the shape of an object or other parameter is detected is improved. With the prior art multibeam antenna, the shape of the beam is distorted to a greater extent toward both ends. Therefore, the range of azimuths in which measurements can be made at a required accuracy has been narrow. However, where the present invention is exploited, the range of azimuths in which measurements can be made at high accuracy can be extended. In this way, the present invention yields excellent advantages which have not been obtained by the prior art techniques.

In the novel multibeam radar system, those of received signals of various transmission-reception channels which arise from substantially the same distance are simultaneously subjected to deconvolution processing. Consequently, numerous signal reflecting sources distributed in a two-dimensional space comprising distances and azimuths can be detected with high resolution. Hence, the kind, width, and azimuth of an object existing in a two-dimensional space and the distance to the object can be discerned and measured with high accuracy.

What is claimed is:

1. A multibeam radar system comprising:

a multibeam transmission-and-reception apparatus for transmitting beams of ultrasonic waves or radio waves in a direction, receiving echo signals from an object, electronically scanning the transmitted beams while changing the direction of the transmitted beams discretely, and repeating these operations for plural transmission-reception channels determined according to directions of transmission and reception;

a reception level-holder for detecting intensities of echo waves received from the object at the transmission-channels, detecting a distance to the object or a corresponding physical quantity, and successively storing the intensities as reception levels of the transmission-reception channels;

a matrix or inverse matrix multibeam pattern storage means for previously creating and storing a matrix of multibeam patterns comprising a matrix of beam patterns corresponding to the transmission-reception channels or a matrix that is an inverse of the first-mentioned matrix, said beam patterns being squares of directivities of the transmitted beams of the transmission-reception channels represented in terms of sets of discrete values of the directions of transmission and reception; and an inverse calculator for arranging those of the reception levels of the transmission-reception channels stored in the reception level storage which show substantially the same distance or corresponding physical quantities in corresponding rows or columns, performing inverse calculation processing according to said matrix or inverse matrix of said multibeam patterns already stored in said matrix or inverse matrix multibeam pattern storage, whereby calculating correcting values for the reception levels of the transmission-reception channels.

2. A multibeam radar system comprising:

a signal generator for producing an FM signal whose frequency varies with time;

a multibeam pattern transmission-and-reception apparatus for providing a different beam pattern for a different scanning direction of transmission and reception;

a multibeam pattern storage for storing beam patterns of all scanning directions;

a mixer for transmitting the FM signal toward an object, receiving echo signals from the object, mixing signals in association with the transmitted signals and with the echo signals, and generating a beat signal indicating a distance to the object;

an analyzer for analyzing the beat signal by means of a spectrum;

an echo signal storage for storing spectra of echo signals of all scanning directions; and a signal-processer for processing spectra of echo signals of all scanning directions by deconvolution techniques, using said multibeam pattern storage means.

3. The multibeam radar system of claim 1, wherein said multibeam transmission-and-reception apparatus is equipped with a defocus multibeam antenna.

4. The multibeam radar system of claim 1, wherein said multibeam transmission-and-recepter is equipped with a phased array antenna.

5. The multibeam radar system of claim 2, wherein said multibeam transmission-and-reception apparatus is equipped with a defocus multibeam antenna.

6. The multibeam radar system of claim 2, wherein said multibeam transmission-and-recepter is equipped with a phased array antenna.

7. The multibeam radar system of any one of claims 1–4, wherein beams transmitted by said multibeam transmission-and-reception means are beams of FM signals whose frequencies vary with time.

8. A multibeam radar system comprising:

a multibeam transmission-and-reception apparatus for transmitting beams in a direction, receiving echo signals from an object, electronically scanning the transmitted beams while changing the direction of the transmitted beams, and repeating the foregoing steps for plural transmission-reception channels;

a reception level-holder for detecting intensities of echo waves received from the object at the transmission-channels, detecting a physical quantity with respect to the object, and successively storing the intensities as reception levels of the transmission-reception channels;

a matrix multibeam pattern store for creating and storing a matrix of beam patterns corresponding to the transmission-reception channels which are squares of directivities of the transmitted beams of the transmission-reception channels represented in terms of sets of discrete values of the directions of transmission and reception; and an inverse calculator for arranging those of the reception levels of the transmission-reception channels stored in the reception level store which represent substantially the same physical quantities in corresponding rows or columns, performing inverse calculation processing according to said matrix of said multibeam patterns already stored in said matrix multibeam pattern store and for calculating correcting values for the reception levels of the transmission-reception channels.

9. A multibeam radar system comprising:

a signal generator for producing an FM signal whose frequency varies with time;

a multibeam pattern transceiver for providing a different beam pattern for a different scanning direction for transmission and reception;

a multibeam pattern store for storing beam patterns of plural scanning directions;

a mixer for transmitting the FM signal toward an object, receiving echo signals from the object, mixing signals in association with the transmitted signals and with the echo signals, and generating a beat signal indicating a distance to the object;

an adapter for analyzing the beat signal by means of a spectrum;

an echo signal store for storing spectra of echo signals of all scanning directions; and a signal processor for processing spectra of echo signals of all scanning directions by deconvolution techniques, using said multibeam pattern storage means.

10. A multibeam radar system comprising:

a signal generator for producing an FM signal whose frequency varies with time;

a multibeam pattern transmission-and-reception apparatus for providing a different beam pattern for a different scanning direction of transmission and reception;

a multibeam pattern store for storing beam patterns of scanning directions;

a mixer for transmitting the FM signal toward an object, receiving echo signals from the object, mixing signals in association with the transmitted signals and with the echo signals, and generating a beat signal indicating a distance to the object;

an FFT analyzer for analyzing the beat signal by means of a spectrum;

an echo signal store for storing spectra of echo signals of all scanning directions; and a signal-processor for processing spectra of echo signals of all scanning directions by deconvolution techniques, using said multibeam pattern storage means.

* * * * *